United States Patent [19]

Weber

[11] 4,372,679

[45] Feb. 8, 1983

[54] IMAGE ILLUMINATION COMPENSATION METHOD AND APPARATUS

[75] Inventor: Harold J. Weber, Sherborn, Mass.

[73] Assignee: Coulter Systems Corp., Bedford, Mass.

[21] Appl. No.: 240,201

[22] Filed: Mar. 3, 1981

[51] Int. Cl.$^3$ .............................................. G03B 27/54
[52] U.S. Cl. ........................................ 355/70; 355/77
[58] Field of Search ...................... 355/11, 69, 70, 50, 355/51, 8, 77

[56] References Cited

U.S. PATENT DOCUMENTS 2,260,495 10/1941 Tutwiler ................................ 355/70
4,086,010  4/1978 Gallo, Jr. et al. ...................... 355/70

*Primary Examiner*—Richard A. Wintercorn

[57] ABSTRACT

Compensation is provided in the illumination of a mechanically line scanned object plane scene, where the light source is moved across the object plane to provide the light necessary for optical projection of the scene onto an image plane. This compensation gives allowance for the difference in light ray coupling effectiveness of the usual projection optics arrangement for light rays which are on axis with the component lenses, relative to the light rays which are off axis. Predetermined compensation of the illumination which nearly matches the off-axis falloff optical characteristics of the projection optics system may provide a substantially flat, uniform field illumination of the projected scene at the image plane. The instantaneous position related illumination is controlled, from a function usually stored in an electronic memory, by changing the effective electric power applied to the illuminating lamp during any predetermined frame of time.

21 Claims, 8 Drawing Figures

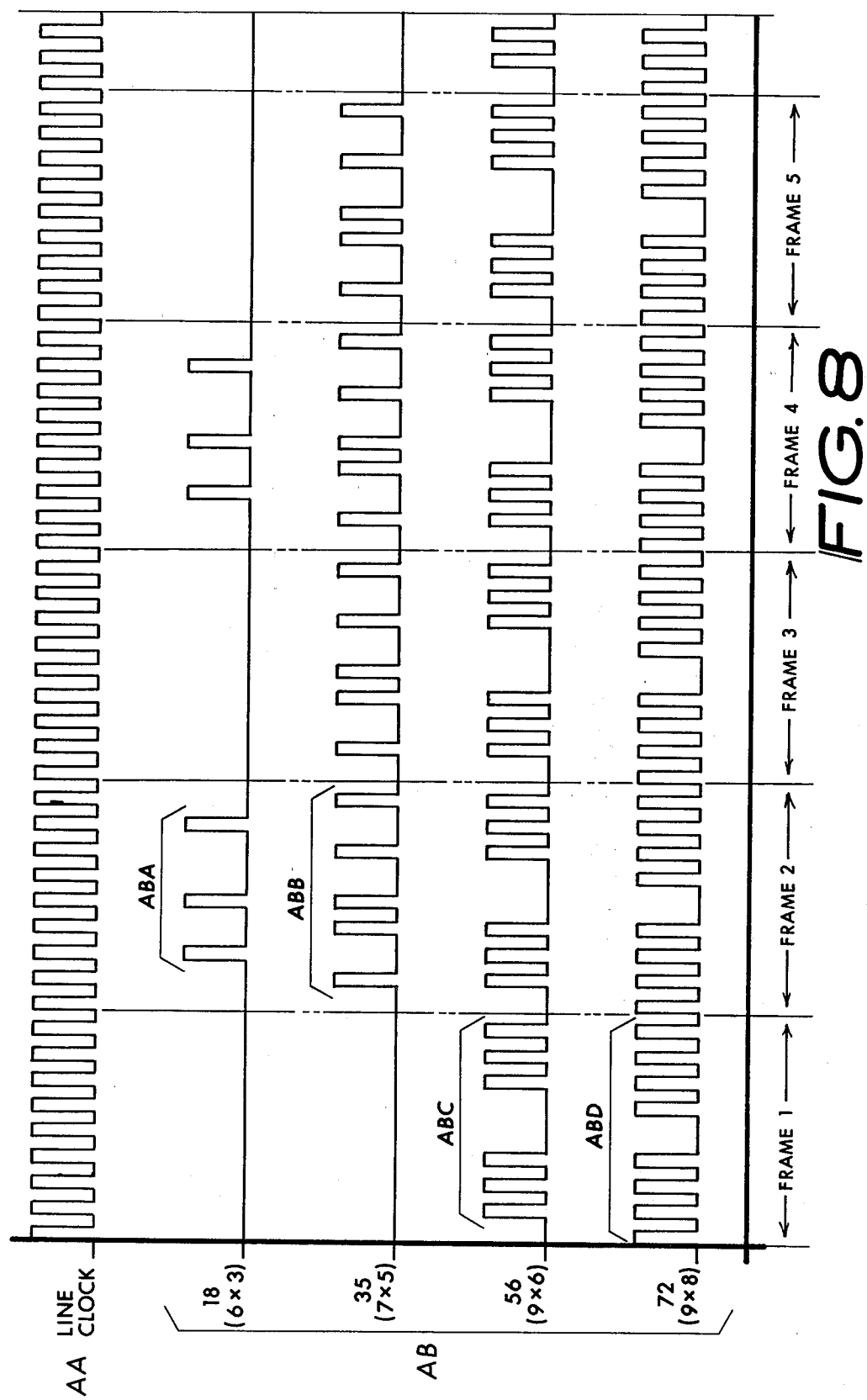

IMAGE ILLUMINATION COMPENSATION METHOD AND APPARATUS

BACKGROUND OF THE INVENTION

In the layout of an imaging system, the apparent uniformity of the illumination projected onto the image plane is affected by the off-axis ability of the optical lens system to be able to gather light from the illuminated object plane scene. This is to say that, generally, the best light coupling occurs on the optical axis of the lens, while any coupling at any off-axis angle will be less good.

In the usual projection optics imaging system, this off-axis falloff does not matter unless the projection angle is wide. Such is the reason why the effect, while present, can be safely ignored in the usual photographic type application.

On the other hand, when the angle is determined to be wide: that is when the maximum off-axis imaging angle is over about 20 degrees, the off-axis nonuniformity effect does lead to deleterious overall results. Such a nonuniform condition may be further aggravated by an object plane scene projection system wherein the image receptor is particularly sensitive to variation in the average light received from the scene insofar as the desired final result is concerned. Therefore, the lens falloff becomes a problem when the intrinsic latitude of the imaging system, including the image receptor, does not have enough range to produce a satisfactory end result.

SUMMARY

In an imaging system, such as encountered in a large, usually flatbed, lithographic platemaker camera or the like, the light source may be caused to traverse the long direction of the original artwork which is situated on the object plane. This is say that the light source appears like an intense line of light which is essentially perpendicular to the artwork prime axis. The light is then induced to move, or scan, along the artwork's prime axis.

What happens is that, as the light moves along and scans the artwork, more light will reach the image plane when the light from the artwork scene is on-axis with the lens and near the artwork center than when it is at either off-axis extremity.

Compensation for such a scanning light arrangement can be made on the axis which is perpendicular to the axis of light travel by way of a suitable double taper, e.g., butterfly shaped, mask critically located in the optical path and effective to produce the necessary compensation for lens falloff in the one direction which is essentially perpendicular to the light source travel axis relative to the object plane scene. In the other direction, along the light travel path axis, such compensation of the illumination is best made by causing the overall light reaching the artwork scene object plane to vary in accord with its relationship to the lens central axis. This desired effect is met by controllably dimming the light source by some predetermined amount when it is on-axis with the lens, while allowing it to be proportionately brighter the further displaced it is on either side of this central optical axis.

It is therefore a purpose of this invention to cooperate with a lithographic, or flatbed, photographic process camera so as to vary the average light reaching the original artwork from a moving exposure light source and thereby effectively compensate the average light collected from the artwork bearing object plane and passing through the projection lens system and reaching the image plane for the usual losses produced by inequality of optical efficiency for light rays having various off-axis extensions relative to the projection optics axis.

It is another purpose of this invention to variously effect a compensation of off-axis light rays passing through an imaging optical system to have a greater initial value, as produced by a light source, which will offset the off-axis performance degradation of a lens system and thereby produce a virtually constant illumination of the image plane for any angular displacement between the projection optics, and the object plane and the image plane.

Still another purpose is to teach how a traveling exposure light source may be variously modulated in a controlled way such that the on-axis light rays reaching a lens system are initially less bright than those arriving off-axis, producing ready compensation for the off-axis optical efficiency falloff for the lens system thereby producing a substantially constant light value on the image plane axis which is coincident with the light source travel axis.

Yet another purpose for the instant instruction is to yield an electric control system which may be used conjointly with a traveling exposure lamp to produce a variation in the exposure lamp output which deviates in proportion with the reflection position of the lamp relative to an optical system axis; further wherein the variation is produced in true accord with a preestablished electrical contour which principally coincides with the particular optical system's off-axis efficiency relative to its on-axis efficiency.

Still another purpose is to provide an exposure light source which varies in illumination value as its effective position is moved over the lens field so as to produce a substantially constant image plane illumination at least in the direction of source position movement.

Lastly, a purpose is to provide an exposure light controller which varies in average illuminative value with time and in accord with the optical character of the position of a lens system field, and further having the overall average light value being adjustable with the least effect on the overall ratio of the controller variations relative to off-axis position.

DESCRIPTION OF DRAWINGS

FIG. 8 Pulse train signal combinations for various rate multiplier controlled lamp power pulse outputs for the circuit of FIG. 6.

DESCRIPTION OF PREFERRED EMBODIMENTS

Figure 1:
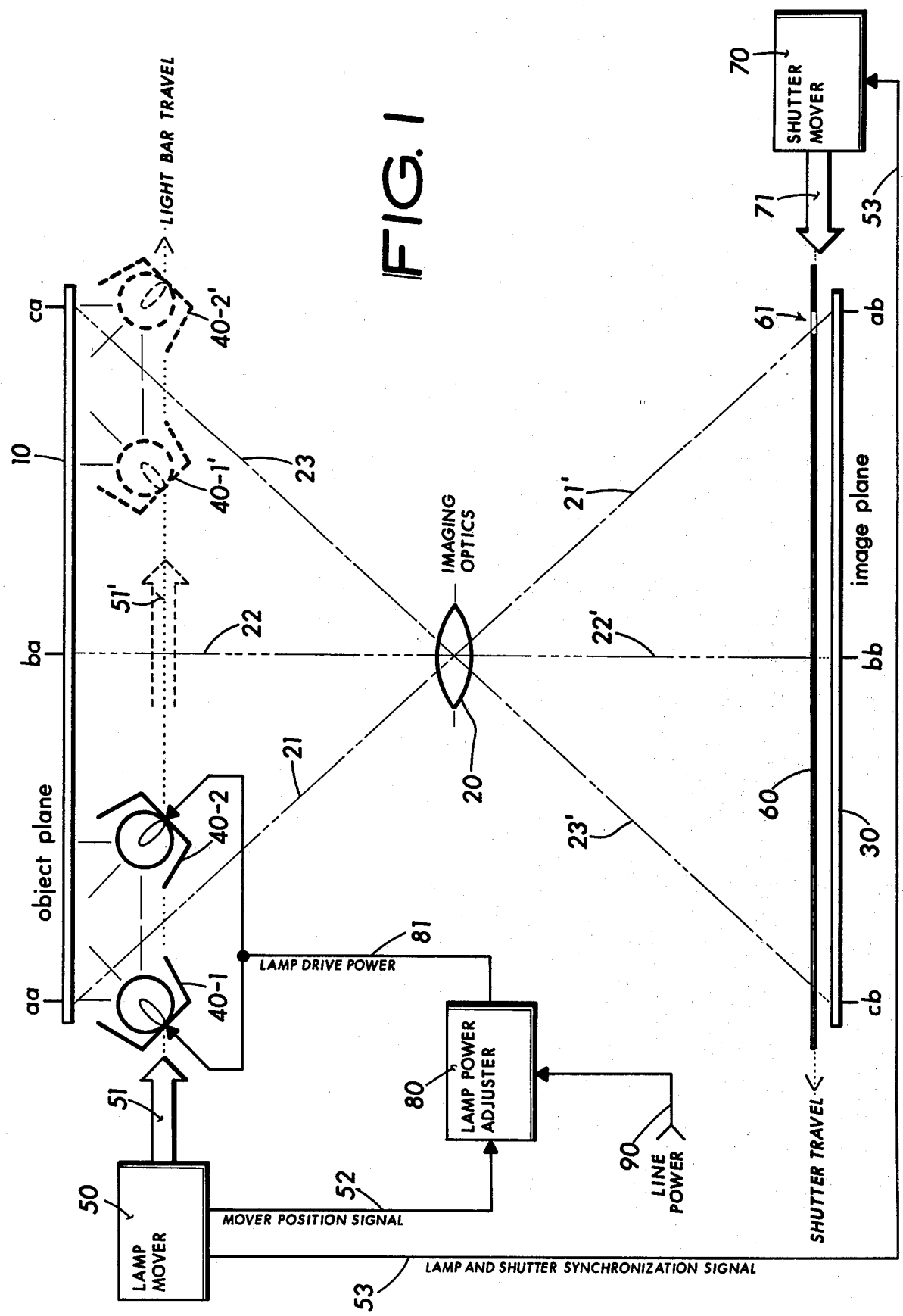
FIG. 1 Depicts the relationship between the object plane, the moving lamp, the imaging optics, the image plane and the moving mask juxtaposed near the image plane.

The illumination and projection of an object plane image 10 onto an image plane 30 is shown in FIG. 1. The essential elements include a source of line illumination 40-1, 40-2 which is provided to move 51 from left to right across the object plane by a lamp mover 50, e.g. a motor drive or the like. Imaging optics 20 is provided which collects the illustrative ray 21 from location aa on the object plane 10 and projects it to a position ab on the image plane 30. A moving shutter slit 60 provides an aperture for the ray 21', while blocking any stray rays. The shutter 60 is synchronized 53 to be driven right to left 71 by the shutter mover 70, also a motor drive element. What is provided is a means which efficiently translates the viewed object scene onto the image plane as a line-by-line scan operation, albeit the line transitions appear continuous. With the usual projection optics, the on-axis ray 22' reaching the image plane bb is substantially brighter than any of the off-axis ray 21', 23' typified by positions ab, cb. Therefore, the average light energy produced by the illumination sources should be maximum for the positions near the edge of the object plane scene aa, ca and substantially less for the on-axis position ba.

Figure 2:
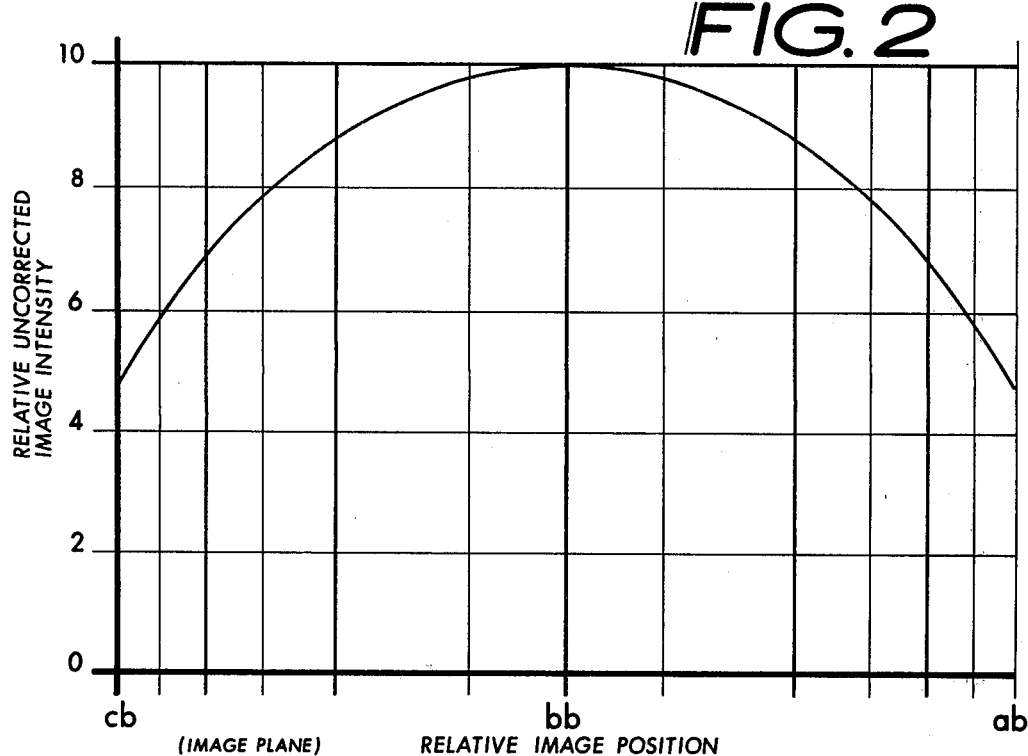
FIG. 2 Plot showing the illumination off-axis light ray coupling fall-off of a typical imaging optics.

FIG. 2 depicts the light coupling efficiency of a typical projection imaging optics system. As the curve teaches, when the relative image position bb is on-axis with the optics, a maximum projected image intensity is produced, while off-axis positions ab, cb may only produce about half the effective light energy.

Figure 3:
FIG. 3 Plot showing step-like compensation of light source output to offset fall-off imaging optics light ray coupling efficiency.

FIG. 3 shows how the illumination level, e.g. effective average brightness, of the light source (or lamp output) may be varied from a maximum value at the edges of the object plane scene aa, ca to a minimum near the on-axis position ba. It is possible to reduce the average effective light energy by about half which serves to correct the equivalent increase in on-axis efficiency shown to occur in FIG. 2.

Figure 4:
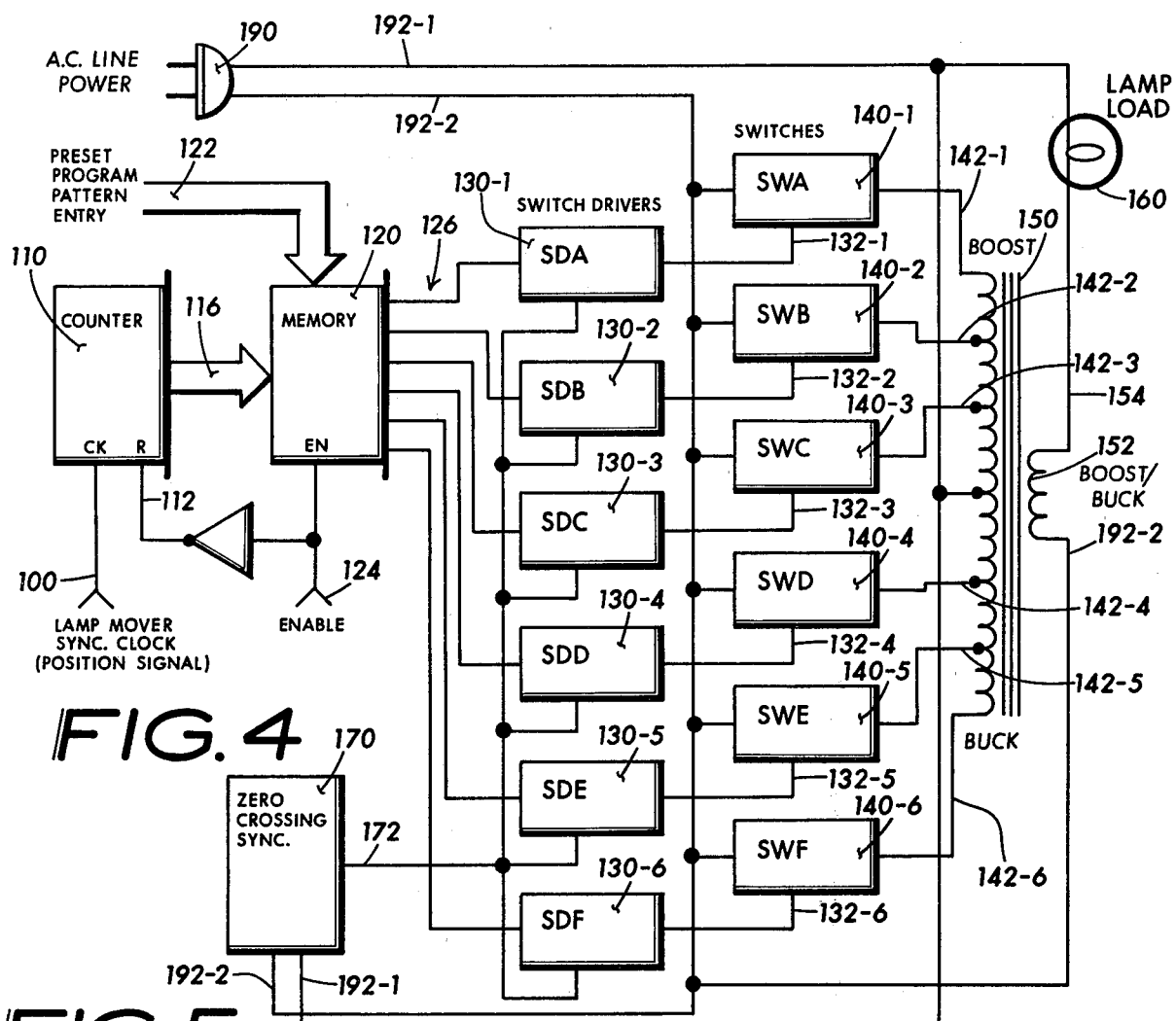
FIG. 4 Elemental schematic for lamp control obtained through the action of a boost-buck transformer with the primary switching combination controlled by signals derived from a memory.
Figure 5:
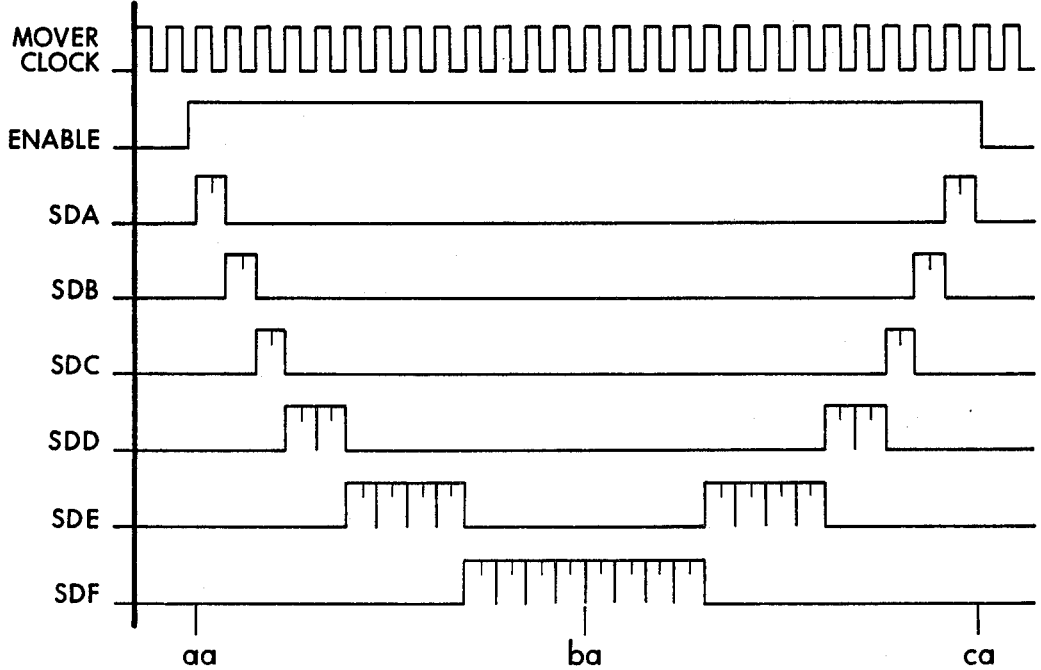
FIG. 5 Pulse train signal combinations for the switch control elements depicted in FIG. 4.

The embodiment of FIG. 4 provides the control effect of the lamp load 160 necessary to practice the invention. The lamp 160 receives a.c. line power 190 on line 192-1 directly to the lamp, and on line 192-2 through transformer winding 152 and continued on line 154 to the other lamp connection. The winding 152 serves to ADD or SUBTRACT effective line potential from the source 190 value to effectively dim or intensify the lamp. Control is achieved by receiving a position signal 100, which is usually a train of pulses which start at zero at one end of the lamp mover travel, and increase count as the lamp moves. This pulse train advances the counter 110 producing a binary output 116 which addresses a memory 120. Alternatively, the lamp mover synchronization signal 100 may be from a mechanical position to an electrical signal encoder in the form of a signal train of binary bytes which can couple directly into the memory address 116. The memory 120 has a preset program 122 stored therein predetermined to be substantially representative of the imaging optics coupling efficiency over the field of view. The memory acts as a decoder, producing an electrical signal sequence function, which addresses 126 the several switch drivers 130-1 through 130-6. The switch drivers serve to produce trigger pulses for thyristor switches 140-1 through 140-6 by lines 132-1 through 132-6. The trigger pulses are also produced to synchronously change at the power line waveform zero crossover point to reduce transients, and electrical strain on the transformer 150. This zero crossover control is produced by the zero crossover synchronization signal source 170, which couples 172 with the switch drivers. Each switch 140-1 through 140-6 couples with a predetermined tap position 142-1 through 142-6 on the boost/buck transformer 150. In combination with FIG. 5, what is shown to occur is that as the mover clock pulses advance, and the ENABLE is active, switch driver SDA is first ON, then driver SDB, followed by driver SDC, SDD, SDE and SDF, whereupon the sequence reverses descending through SDF, SDE, SDD, SDC, SDB and back to SDA as the lamp mover scan completes. The predetermined arrangement is such that when the ba position in the SDF pulse is reached, the imaging optics are exactly on axis. Therefore, when SDA is ON, the maximum BOOST connection 142-1 is ON, whereas when SDF is ON, the maximum BUCK connection 142-6 is ON.

Figure 6:
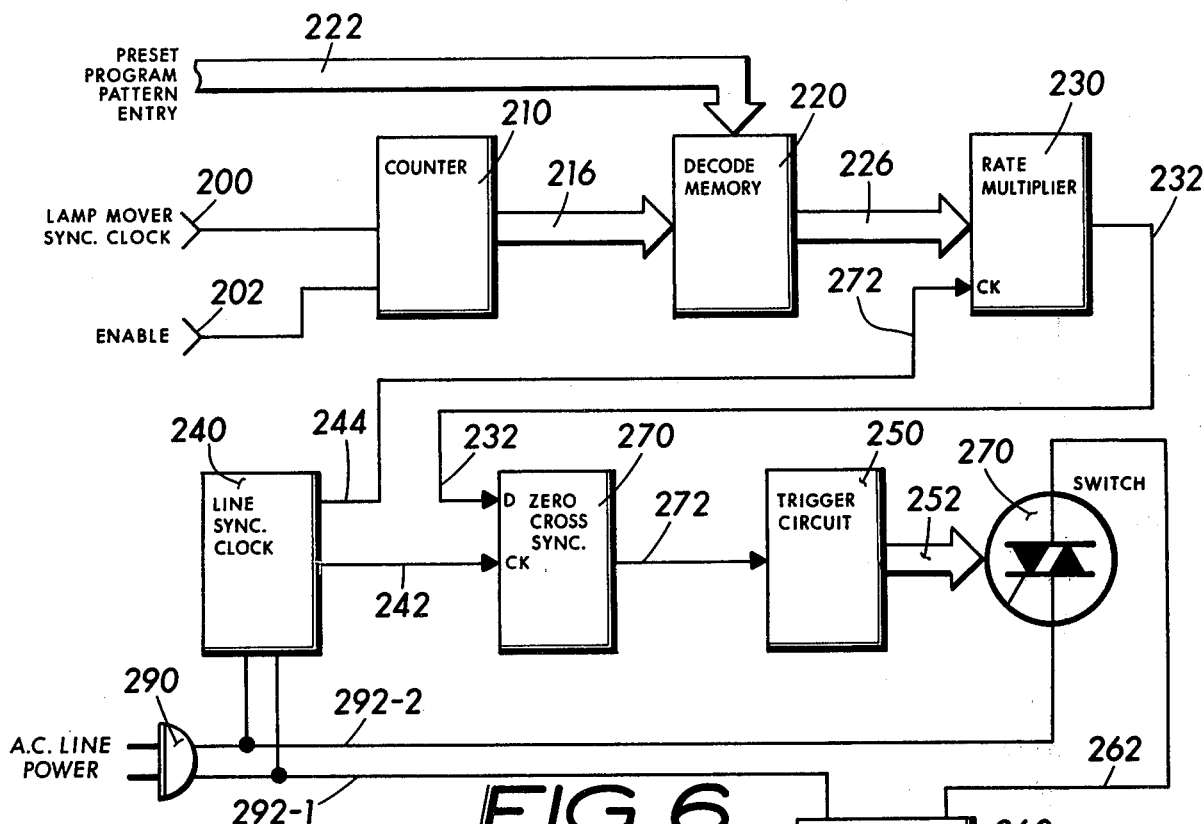
FIG. 6 Elemental schematic for lamp control obtained through the action of a rate multiplier whereby the average number of power pulses is varied to change the lamp intensity from signals provided by a memory synchronized with the lamp mover.

The arrangement of FIG. 6 is preferable for pulsed Xenon, or other discharge type high intensity lamps. These types of lamps produce a "pulse" of light energy for each power line half cycle. The arrangement is also useful with incandescent type lamps. The lamp 260 couples with the a.c. power line source 290 through lines 292-1 and 292-2, with the latter coupled through a thymistor switch (triac or the like) 270 and line 262. The lamp mover synchronization clock signal 200 couples with a counter 210 which, when enabled 202, produces a continuum of binary bytes 216 which collectively act to address a memory 220. The memory has a preset program entered which is predetermined to best describe the illumination compensation necessary for the imaging arrangement, including the optics, which is subject to adjustment. As the counter ascends count, a train of weighted binary bytes 226 are produced which act as DATA inputs to a rate multiplier 230. As is well understood (ref: R.C.A. Handbook "COS/MOS Integrated Circuits" 55D-203C, pages 413–416) the rate multiplier produces a unique train of individual pulses at the output 232, the number of which are, during any predetermined number of input pulses, determined by the binary word connected to the data (or control) input 226 thereto. For example, if during a predetermined period, a binary word "one" is coupled thereunto, only one pulse will output during the period. Alternatively a binary work "nine" produces nine pulses at the output during the same period. Therefore the action is that, under instruction from the memory, the number of pulses on line 232 coupled with the zero crossover synchronization function 270 will vary. The synchronizer 270 also received clock pulses 242 from the line synchronization clock element 240 which enables all switching action changes to occur when the energy in the circuit is about zero. The trigger circuit 250 receives the synchronized control pulses 272, serving to trigger, or turn on, the switch 270 through coupling 252.

Figure 7:
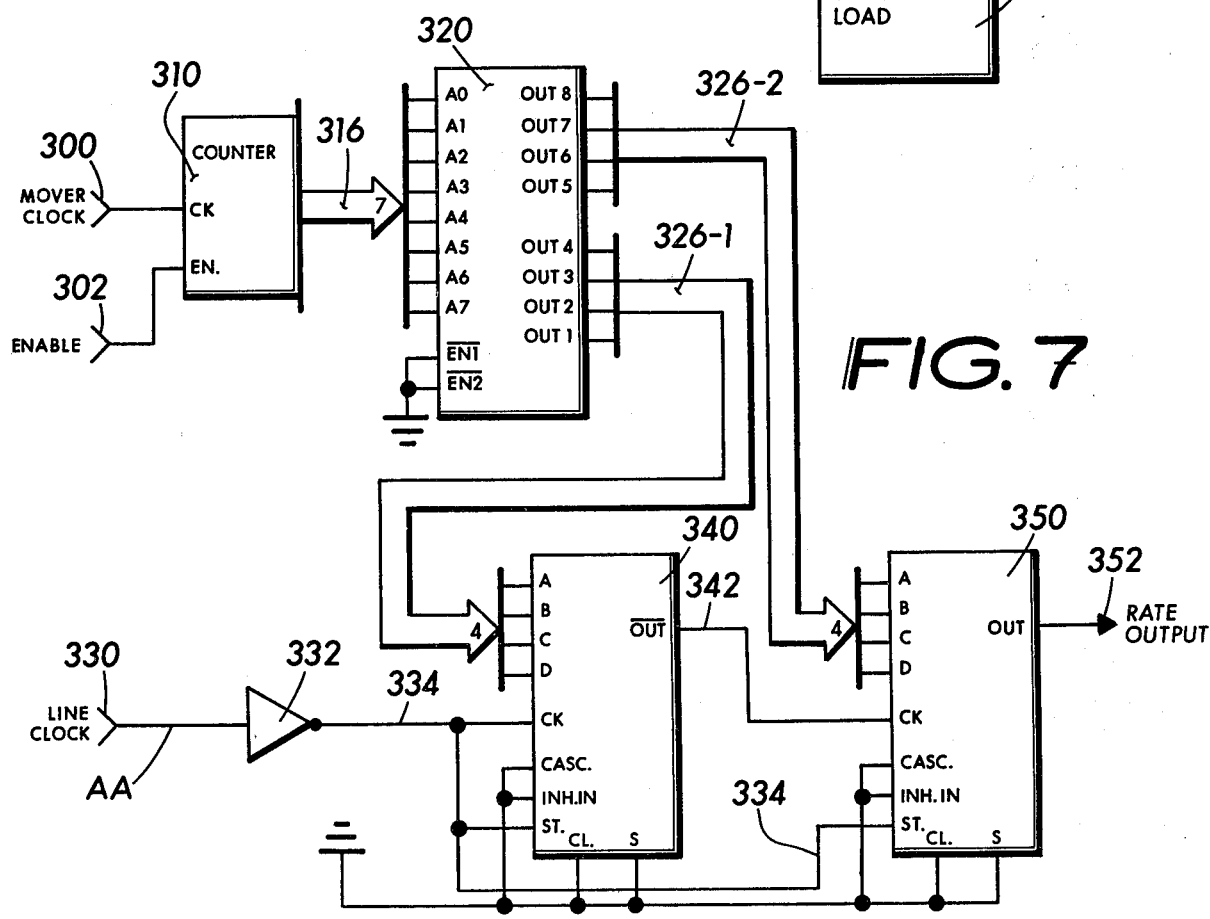
FIG. 7 Partial connection diagram for rate multiplier and memory interconnections.

The preferred embodiment for a rate multiplier embodied controller is taught in FIG. 7. The mover clock pulses 300 advance counter 310 when enabled 310. The resultant data bytes 316 address the memory 320, by way of example a preprogrammed National Semiconductor Corporation type DM7577. The eight bit memory is divided into two separate binary lines 326-1, 326-2, each providing a sequence of thirty-two four-bit work bytes. The byte signals on line 326-1 couple with rate multiplier 340, preferably an RCA type CD 4527. The line clock 330 is a continuun of power line frequency pulses coupled, by an inverter 332 for wave shaping, to the rate multiplier clock line 334. The hookup for the two rate multipliers 340, 350 is usual with the output 342 of the first clocking the second. With the BCD rate multipliers shown, the circuit waveforms are shown in FIG. 8. The line clock, usually 60 or 50 hertz is shown AA. With a memory output of 18, the rate multiplier combination AB will be 6×3. This is to say, for nine frames of time, three pulses ABA will output during each of six of the nine frames. In a like way, the combination 35 (7×5) produces seven frames each providing five pulses. Also shown is the combination 56 (9×6) producing nine frames of six pulses each, and the combination 72 (9×8) producing nine frames of eight pulses each.

This irregular pulse sequence, characteristic of this class of control using a rate multiplier, does not materially affect the illumination effect because the repetitive cycle is so rapid relative to the usual imaging system scanning elements that the total light is effectively integrated.

What is claimed is:

1. Illumination control compensation method, in which an object plane is scanned by effectively moving a source of modulated light along the longitudinal axis of the object plane whereby a part of the light reflected from the object plane is received by imaging optics and projected upon an image plane; said control providing modulation for the said source of light to be effectively less intense when juxtaposed relative to that portion of the object plane which is substantially on-axis with the said optics, and increasingly more effectively intense when alternatively positioned so as to produce an increase in off-axis angle between the said object plane and the imaging optics; the improved effect providing compensation for the fall-off of light ray coupling efficiency of the off-axis rays relative to the on-axis rays impinging on the optics and thereby producing substantially uniform illumination at the image plane, at least in the direction of effective light source travel.

2. A method for equalizing the light projected onto an image plane from an illuminated object plane by lens means; whereby the light level near the edges of at least one longitudinal axis of the image plane, and usually substantially off-axis relative to the lens means, is corrected to be of about the same intensity level as the light which is near the middle of the image plane and usually about on-axis relative to the lens means, the method comprising at least:
 a. scanning the said object plane along the longitudinal axis with a juxtaposed and relatively movable source of light;
 b. projecting the scanned object plane image through a lens means onto the image plane; and,
 c. modulating the light level produced by the said source impinging on the object plane to be about maximum near the edges of the object plane, and to be decremented in light level near the middle of the image plane in correlation with the incremental increase in light ray coupling efficiency of the lens means for substantially on-axis rays relative to off-axis rays.

3. In an optical imaging method wherein a movable illumination source scans across the object plane field; a movable aperture scans across the image plane field in substantial synchronization with the said movable light source; and imaging optics is situate in predetermined orientation therebetween to effectively project the illuminated object plane field onto the image plane field; whereby further said optics is ordinarily more efficient in projecting on-axis illumination light rays than it is off-axis light rays, resulting in more effective light reaching the center of the image plane field than what reaches the edges of the image plane field; improvement being in the combination of:
 producing light energy from the said source which is adjustable between a maximum and a minimum value, whereby said maximum value corresponds with the light energy necessary to efficiently illuminate the edges described by the longitudinal light source scanning axis of the object plane and provide allowance for the decrease in the optical coupling for off-axis rays received from along the longitudinal axis, and the said minimum value corresponds with the light energy necessary to efficiently illuminate the center of the object plane when the on-axis ray optical coupling is most efficient.

4. In an optical imaging method wherein a movable illumination source scans across the object plane field; a movable aperture scans across the image plane field in substantial synchronization with the said movable light source; and imaging optics is situate in predetermined orientation therebetween to effectively project the illuminated object plane field onto the image plane field; whereby further said optics is ordinarily more efficient in projecting on-axis illumination light rays than it is off-axis light rays, resulting in more effective light reaching the center of the image plane field than what reaches the edges of the image plane field; improvement being in the combination of:
 a. producing light energy from the said illumination source which is about maximum intensity near the edge of the object plane field;
 b. producing light energy from the said illumination source which is about minimum intensity near the center of the object plane field; and,
 c. producing a functional, relatively gradual, change in said light energy from about maximum to about minimum, then usually back to about maximum value in synchronization with the travel of the juxtaposed said movable source along the longitudinal axis of the object plane.

5. In an optical imaging apparatus wherein a movable illumination source means scans across the object plane field, a movable aperture scans across the image plane field in substantial synchronization with said movable light source means, and imaging optics means is situate in predetermined orientation therebetween to effectively project the illuminated object plane field onto the image plane field; whereby further said optics means is ordinarily more efficient in projecting on-axis illumination light rays than it is off-axis light rays, resulting in more effective light reaching the center of the image plane field than what reaches the edges of the image plane field; improvement being in the combination of:
 a. object plane means usually including subject matter;

b. light source means juxtaposed relative to said object plane means;
c. mover means for traversing said light source means throughout a longitudinal axis extension of the said object plane means;
d. image plane means adapted to receive light images;
e. imaging optics means effective to translate a light image of the object plane means, including any subject matter, onto the said image plane;
f. a source of primary electric power; and,
g. control means having a first input coupled with said source of primary electric power; an output coupled with said light source means for producing power thereto; and a control input coupled with said mover means for receiving signals therefrom indicative of the position of the light source means relative to the object plane; the combination thereof operative to produce light energy from the said light source means which is predeterminately adjustable between a maximum and a minimum value, whereby said maximum value corresponds with the light energy necessary to efficiently illuminate the edges described by the longitudinal axis of the object plane and provide allowance for the decrease in the optical coupling for off-axis rays received from along the longitudinal axis, and the said minimum value corresponds with the light energy necessary to efficiently illuminate the center of the object plane when the on-axis ray coupling is most efficient.

6. Imaging apparatus of claim 5 wherein said functional change in light energy is predetermined to correlate with the change in light ray coupling effectiveness of the said imaging optics along the longitudinal axis of the object plane field of view.

7. Imaging apparatus of claim 5 wherein said light source comprises an electric lamp wherein the electric power applied thereto is controlled in a predetermined series of steps which controls the lamp light intensity and correlates with the light ray coupling efficiency of the imaging optics axis for various object plane field angles.

8. Imaging apparatus of claim 5 wherein said light source comprises an electric lamp wherein the electric power applied thereto is controlled through alternately switching of the said power on and off in rapid succession, whereby the absolute power controls the lamp light intensity through various ratios between the on time and the off time of the electric power which correlates with the light ray coupling efficiency of the imaging optics axis for various object plane field angles.

9. Imaging apparatus of claim 5 wherein said object plane includes graphic arts matter and said image plane includes an electrophotographic member, the combination of which, together with a projection lens, comprises the essence of an electrophotographic image reproduction camera means.

10. Imaging apparatus of claim 5 wherein said light source means is an incandescent lamp means.

11. Imaging apparatus of claim 5 wherein said light source means is an arc discharge lamp means.

12. Imaging apparatus of claim 5 wherein said light source means is an Xenon inert gas discharge lamp.

13. Imaging apparatus of claim 7 wherein said electric power is incremented and decremented through a series of electrical steps by the boost and buck effect of a transformer secondary winding coupled in series with said electric power; whereby said transformer includes a plurality of boost and buck primary connections which are successively selected under the control of a function control means, such as a memory, to produce a modulation of the light source in accord with the optical light ray coupling efficiency profile of the said imaging optics.

14. Imaging apparatus of claim 13 wherein said function control means is predetermined, as by a program, to effect a sequence of electrical control signals representative of the light ray coupling efficiency of the imaging optics for various off-axis angles.

15. Imaging apparatus of claim 8 wherein said various ratios between the on-time and the off-time of the electric power are produced by a binary rate multiplier, whereby further said rate multiplier includes a binary data input thereto for receiving control signals from a function control means, such as a memory, describing the optical light ray coupling effectiveness of the imaging optics for various off-axis angles.

16. Imaging apparatus of claim 8 in which the said source of primary power is alternating current and wherein said on-time and said off-time periods each represent at least the time period of integral half cycles of the said source of primary power.

17. Imaging apparatus of claim 8 in which the said source of primary power is alternating current and said switching of the said power on and off is substantially synchronized to occur near the zero crossing level of at least integral half cycles of the alternating current wave.

18. Imaging apparatus of claim 8 in which the said switching is provided by a thyristor semiconductor means.

19. Imaging apparatus of claim 8 further including:
a. source of mover clock pulses substantially derived from the transversal of the said light source means;
b. counter means having a clock input thereto coupled with said mover clock pulses, having a plurality of binary pulse states output therefrom indicative of said mover means position relative to said object plane;
c. memory means having as a first input a predetermined arrangement of memory cell states indicative of various illumination values which correlate with various off-axis ray coupling efficiencies of the said imaging optics; having at least a second input coupled to receive said binary pulse states as a memory cell address signal; providing an output therefrom which comprises a binary byte signal representative of the predetermined memory cell state combination selected by the said address signal;
d. rate multiplier means having a data input thereto coupled with said binary byte signal to determine the binary rate multiplication providing a unique pulse state sequence as produced at an output therefrom;
e. trigger circuit means having an input coupled with said unique pulse state sequence, effective therewith to produce at least one trigger pulse therefrom for each component pulse of the said pulse state sequence; and,
f. thyristor switch element means coupled between said source of primary power and said light source means for the on and off control of electric power flow therebetween; including a gate control input thereto coupled with said trigger pulse and effective to at least enable the flow of power through the said thyristor.

20. Imaging apparatus of claim 19 further including a zero cross alternating current wave synchronization means coupled effectively between the said trigger pulse produced by the said trigger circuit means, and the said gate control input of the thyristor switch means.

21. Imaging apparatus of claim 13 wherein said memory is folded, with the various predetermined memory cell states representing the necessitous increase in object plane illumination between the imaging optics on-axis light ray coupling efficiency and a first extreme off-axis angle light ray coupling efficiency; whereby the increase between the on-axis orientation and any other similar off-axis angle of object plane orientation is compensated in illumination level through selecting, albeit in reverse order; substantially the same sequence of memory cell states as selected for the said first off-axis angle.

* * * * *